United States Patent [19]
Tomomatsu

[11] Patent Number: 4,578,272
[45] Date of Patent: Mar. 25, 1986

[54] PREPARING YEAST BAKERY PRODUCT FLAVORS
[75] Inventor: Hideo Tomomatsu, Crystal Lake, Ill.
[73] Assignee: Quaker Oats Company, Chicago, Ill.
[21] Appl. No.: 735,275
[22] Filed: May 17, 1985

Related U.S. Application Data

[63] Continuation-in-part of Ser. No. 242,883, Mar. 12, 1981, abandoned.
[51] Int. Cl.⁴ ............................................. A21D 2/00
[52] U.S. Cl. ...................................... 426/18; 426/19; 426/27; 426/48
[58] Field of Search ...................... 426/27, 19, 48, 18

[56] References Cited
U.S. PATENT DOCUMENTS

| | | | |
|---|---|---|---|
| 2,808,334 | 10/1957 | Battiste | 426/19 |
| 2,969,289 | 1/1961 | Matz | 426/48 |
| 3,102,033 | 8/1963 | Jackel | 426/48 X |
| 3,466,174 | 9/1969 | Bundus et al. | 426/19 X |
| 3,466,177 | 9/1969 | Bundus et al. | 426/19 X |
| 3,499,765 | 3/1970 | Lendvay | 426/48 X |
| 3,615,658 | 10/1971 | Yeave | 426/48 X |

OTHER PUBLICATIONS

The Chemsitry and Biology of Yeasts, 1958, Academic Press: New York, p. 380.
Johnson et al., Preferments, The Bakers Digest, Jun. 1957, pp. 29, 30, 32, 35, 76, 77.

Primary Examiner—Joseph Golian
Attorney, Agent, or Firm—James T. FitzGibbon

[57] ABSTRACT

A method of preparing a yeast bread flavor composition and concentrate which comprises mixing breadmaking yeast with a dilute aqueous sugar solution of not more than about 0.5% sugar and allowing the yeast and sugar to react at 35°–40° C. to form a solution of yeast enzymes. The yeast cells are then removed from the solution and the enzyme solution is mixed with bread making flour and permitted to react at about 35°–40° C. so as to create a bread flavored solution portion and a spent flour portion, both of which are adapted to be freeze-dried and stored. The spent flour and flavor concentrate may also be mixed with each other to provide another flavoring material.

13 Claims, No Drawings

PREPARING YEAST BAKERY PRODUCT FLAVORS

This application is a continuation in part of my earlier filed application, Ser. No. 242,883, filed Mar. 12, 1981 and now abandoned.

The present invention relates generally to bakery products, and more particularly to bakery product flavors and odors, and methods of preparing them. In particular, the invention relates to flavoring materials which are entirely free of live yeast or other components containing biological activity, but which consist of our virtually duplicate the flavor and odor constituents of bread prepared by yeast leavening and baking.

According to the invention, yeast is incubated with a nutrient such as glucose to produce a so-called exocellular enzyme of yeast solution. The yeast cells or remnants are then removed from the solution thus prepared, and the solution is incubated with wheat flour, which is in turn treated to remove the precipitate, after which the flavor solution is freeze-dried to make a white, fluffy, yeast bread flavor product which is almost odorless but contains a yeast bread taste, and which is capable of conversion by further solution into a bread odor, leaving a substantially tasteless, odorless residue.

It is well known that the taste and flavor of yeast leavened bread have almost universal appeal, and yet the flavor itself has never been prepared and made available in solid form. At present, there are several so-called bread flavors available on the market; however, these are liquid mixtures of chemicals having odors more or less similar but not really identical to that of bread. Because of their liquid nature, it is difficult to incorporate them as a flavor producing constituent mixed with flour and available as a commercial premixed, dry bread-making product.

Previous attempts to isolate or obtain dry bread flavors have been unsuccessful even though the odor of leavened bread has been analyzed and the components thereof have been determined. For example, bread itself has been extracted by various solvents, and the extract analyzed by gas chromatography and/or mass spectroscopy. While such experiments detect certain characteristic ingredients, such as substituted pyrazines, as well as other constituents such as various aldehydes, furfural, and ketones, these analyses basically have only contributed knowledge of the odor constituents of the volatile portions of the actual flavor-imparting components. Consequently, efforts to produce yeast bread flavors have been attempts to duplicate the various individual volatile components of bread flavor, rather than the complex flavors as a whole.

In addition to these efforts, efforts have also been made to produce a yeasty bread flavor which would provide both the desired taste and odor. As used herein, "yeast bread" or "yeasty bread" refers to bread made by conventional methods, to which reference will be made herein. However, these efforts have generally been confined to freeze-drying a preparation which was made by fermenting sugar such as sucrose, milk and yeast in a buffer solution. To the extent that these processes were successful in producing some flavor, the mixtures nevertheless had measurable differences in flavor and in particular, were very much lacking in the intensity of the flavor and strength and purity of taste which would be required to commercialize such a product successfully.

If a high quality, concentrated or intense yeasty bread flavor, comprising taste alone or the combination of taste and characteristic odor could be produced, such flavor would be very valuable. Such a dry flavor, in addition to being readily stored, could be used as an additive for known types of ready-mixed bread products produced by chemical leavening, so that an authentic flavor could be imparted to these products. In additon, bakery products other than bread, such as rolls, biscuits, muffins, etc., could use this flavor, while still other bakery products could use such a flavor product to augment their extending flavors.

In view of the failure of the prior art to produce a satisfactory bread flavor material which can be produced and stored in dry form, and in view of the advantages that the material would possess if manufactured, it is an object of the present invention to provide a yeast bread flavor in a dry product which may be subsequently reconstituted for flavoring bread and which may form a component of a commercial dry bread mix.

A further object of the invention is to provide a method for producing an instant bread flavor.

Another further object of the invention is to provide a method of making a bread flavor which is identical to or, almost indistinguishable from, natural bread flavor, but which is free of living organisms, including yeast.

Another object of the invention is to provide a method of making bread flavor component, including a method of preparing an anzyme solution useful for this purpose.

Yet another object of the invention is to provide a method of making a bread flavor which can be reduced to dry, solid form for indefinite preservation.

A still further object is to provide a chemically leavened bakery product having the flavor of yeasty bread and made by adding a flavor essence to a chemically leavened bakery product mix.

A further object is to provide a product comprising a combination of bread flavor mix and a further bread flavor component consistent of so-called spent flour from which the bread flavor has been produced.

A still further object is to provide a chemically leavened or like biscuit or other bakery product which contains a separately produced yeasty bread flavor and spent flour mixture for imparting a desirable flavor thereto.

Yet another object of the invention is to prepare a bread flavor component which is capable of being transformed into a yeast bread essence or odor.

A still further object of the invention is to provide a bread flavor solution which is able to be treated so as to provide a liquid or solid odor-giving product which may be incorporated into bread mixes and other bakery products.

A further object of the invention is to provide a method wherein a very dilute solution of sugar is used as a nutrient or stimulant for yeast to produce exocullular enzymes which may be retained in solution after yeast is separated therefrom.

Another object is to provide a product and method wherein the glucose or other nutrient used for the yeast is in a concentration which is so dilute that the glucose or the like serves as a nutrient only and not as a substrate for the yeast, and wherein the yeast and glucose are used only in the first stage of preparing an enzyme solution, which in turn is used to make flours.

The foregoing and other objects and advantages of the invention of the invention are carried into practice by preparing a yeast enzyme solution by reacting yeast with a dilute glucose or other nutrient solution having a concentration of about 0.5% glucose, thereby producing an exocellular enzyme solution, separating the live yeast components from such solution and incubating the solution with bread flour, separating the spent flour from the supernatant solution, and filtering the solution to provide a clarified solution of essential bread flavor and drying this solution to form a stable, storable bread flavor product. The invention also achieves its objects by providing a flavoring material consisting of the dried product referred to above in combination with a dried product consisting of the spent flour residue, suitably purified and dried. Drying from the frozen state is preferred, although not the only method of drying.

While the invention is capable of being practiced in different ways, the practice of the invention will be described by way of certain examples wherein the material was prepared by using components of white bread of the type adapted to be made into so-called French bread, and using a nutrient solution having a concentration of about 0.5% by weight of glucose in the first stage of preparing an enzyme solution used to make flavoring materials.

It will be understood, however, that modifications and changes to the examples given may be carried out without departing from the principles of the invention.

EXAMPLE 1

The first step of the process was the preparation of a solution of the enzymes derived from compressed, active yeast without destruction of the yeast cells themselves.

Two hundred grams of compressed yeast supplied by the Fleischmann Company and identified as "Fleichmann's Dry Active Yeast" was used. This product had a non-volatile content equal to 68.2% by weight of the specimen was mixed th 1400 milliliters of a 0.5% solution by weight of glucose in water. This mixture was stirred and allowed to incubate at 37° C. for two hours. The resulting mixture was reduced to a temperature of 5° C. and placed in a centrifuge, where it was spun for approximately ten minutes at a force of 20,000 g.

This produced a nearly clear, slightly tan colored supernatant solution with a small precipitate layer.

The mixture was allowed to stand for a short time and was then subjected to a second centrifugal separation under the same conditions, in order to remove additional yeast cells. After being centrifuged twice as referred to above, the supernatant solution was subjected to filtration in a Millipore filter, first using an AW prefilter and then a final filter filtration having a pore size of 0.45 microns. The filterate was a clear, light tan colored solution of so-called exocellular yeast enzyme solution, that is, a solution of enzymes, derived from the incubated yeast solution without rupturing the yeast cells. The supernatant solution weighed 1,236 grams. Accordingly, a first step in the method was the production of an exocellular enzyme solution which, while not a flavor solution itself, is capable of creating a yeasty bread flavor when reacted with wheat or other break making flour. This solution is, for all interests and purposes, completely free of yeast.

For analysis purposes, this solution was freeze dried, and the analysis showed that the non-volatile component of the solution was about 3.44 g. This represents about 2.52% of the dry yeast weight, that is, the 200 grams of yeast contained 136.40 grams of yeast on a dry basis and yielded 3.44 grams of flavor solids.

The next step in th process was the production of the basic flavoring material made with the use of the exocellular yeast enzyme solution. For this purpose, the same amount of similarly prepared exocellular yeast enzyme solution, namely, 1,236 grams, was treated to obtain bread flavor solution, and ultimately solid, dry bread flavor. This was accomplished by diluting the 1,236 grams of enzyme solution with an additional 420 grams of distilled water. To the diluted solution was added 410 g. of wheat flour in a reaction vessel which was closed and incubated with stirring at 37° C. for four hours. The resulting reaction mixture of about 2,066 g. was then subjected to centrifuging in order to separate the bread flavor solution (the supernatant) from what will be referred to as the spent-flour or precipitate, that is, the flour which was "spent" by reaction with the enzyme solution.

The wheat flour used, in one case, was identified as an "All Purpose Flour", manufactured by Ceresota Flour Co. An all purpose NEBCO flour was also satisfactory, as were other all purpose flours obtained from commercial sources. This process created a flavor solution which was straw colored, slightly more viscous than water, and which weighed 1,463 g. After drying from the frozen state, 69.8 g. of a white, fluffy powder remained; this powder was a chemical composition in dry form having a yeasty bread flavor. The composition had almost no odor but had a definite taste of the essence of fresh bread. The wet spent flour component (about 580 G. of a wet basis) was also dried from the frozen state, and yielded 312 g. of a white, low density solid. This component is referred to as the "spent flour" composition.

From the above, it will be understood that the majority of the flavor component of the enzyme solution and flour mixture is in the form of a flavor solution which will yield a fine powder. However, a certain residue, the spent flour component, also contains some flavor constituent, although in less concentrated form and in a form which is not susceptible of easy extraction. Therefore, while the spent flour portion does not contain the concentration of flavor to be found in the flavor solution itself, it contains enough flavor to serve as a component of a useful composite flavoring material. Consequently, in this specification, and in the claims, reference may sometimes by made to a "composite flavor material" by which is meant a flavor material containing or derived from both the flavor solution, (either liquid or dried) and the spent flour composition.

The next step in the process was to demonstrate the preparation of a bakery product which was flavored by the dried solid flavor constituent referred to above.

Accordingly, 66 g. of the yeasty bread flavor produced as referred to above was mixed with 256 g. of Bisquick brand of so-called instant biscuit mix, containing flour and other ingredients as well as chemical leavening agents, such as a baking powder or the like. Bisquick is a commercially available product of the General Mills Company.

To this Bisquick and the bread flavor just referred to, 166 g of milk were added and the dough was mixed, shaped into biscuits, and baked at 232° C. for eight to ten minutes. In relation to a control product which was made merely by adding the Bisquick and milk, the biscuits produced were slightly deformed and were slightly more brown colored, but the product had the unmistakable and definite taste and odor of yeast-leavened biscuits which were totally absent rom the control specimen.

Accordingly, it was determined that it was possible to impart a natural bread flavor to a chemically leavened bread or biscuit product by incorporating a dried flavor composition as referred to above.

In addition to the Fleischmann's Dry Yeast product referred to above, it was possible to produce substantially the same products using other yeasts. These include, for example, "Fleischmann's Compressed Yeast". In addition, a French yeast product identified as "Safe-Instant", an active, dry yeast and made by Societe Industrielle Lesaffre, 5970 Marcq-en-Varoeul, France, was able to be used satisfactorily.

EXAMPLE 2

Next, it was desired to make directly a composite flavoring material in the freeze-dried state. For this purpose an exocellular enzyme solution was prepared and was treated with wheat flour as described in Example 1 above. However, in this case, the exocellular enzyme solution and the flour were permitted to react, and rather than separating the spent flour solution from the enzyme solution by centrifugal action, the entire mixture was subjected directly to drying from the frozen state. This mixture contained 18.3% of bread flavor and 81.7% of spent flour. From this, it was desired to prepare a chemically leavened biscuit containing both spent flour solution and the yeasty bread flavor.

Accordingly, 100 parts of the mixture comprising 18.3% of the yeasty bread flavor and 81.7% of the spent flour obtained in the above example were mixed with 12.2 parts of the yeasty bread flavor obtained in the manner set forth in connection with the description of the bread flavor solids. This mixture was ground thoroughly in a mortar such that the resulting composition consisted of 27.2% yeasty bread flavor and 72.8% of spent flour. 111 g. of this mixture was then mixed with an equal weight of wheat flour, 55 g. of leavening additives comprising sodium bicarbonate, shortening salt, etc., and 157 g. of milk.

As a dough was prepared from these solid and liquid materials, the dough mixture began to generate a pleasant yeasty dough odor characteristic of bread dough prepared by known prior art historical methods. The dough resulting from the above process was shaped into biscuits and baked at 230° C. for eight to ten minutes.

The biscuits prepared in this manner had a clear and definite taste and odor of normal yeasty bread in comparison to the control specimens which did not contain this flavor mixture. The products made as described herein had a more appealing brown color than the control and the shape and heights thereof were exactly the same as the control specimens.

These biscuits were thus prepared by what may be referred to as an augmented flavor mixture, that is, a mixture of both the flavor solids themselves, and a combination of flavor solids and spent flour in the proportions in which they occur if made by the process of the invention.

The above methods included the step of drying from the frozen state or "freeze-drying" products may also be made according to the invention by spray drying or by other known methods. Freeze-drying is a preferred method, although spray drying is more economical. The invention does not depend, however, on the exact nature of the drying method or process.

EXAMPLE 3

In order to evaluate the possible nature of the bread flavor materials above, a solution of bread odor itself was made.

The yeasty bread flavor solution obtained in the foregoing Example 1 (250 g.) was placed in a round bottom flask having a capacity of 500 ml. and equipped with a thermometer. This flask was dipped into a boiling water bath while the contents were being swirled and heated rapidly to 80° to 90° C. The swirling was continued for five minutes. The solution thus heated had lost its characteristic enzyme activity and was cooled by running water and subjected to evaporation at reduced pressure at a temperature of about 40° to 50° C.

During this process, the volatile constituents were collected in dry ice condenser. About 100 ml of the initial evaporate so recovered were characterized by a definite and characteristically present odor of baked yeast bread. The residue remaining after the vaporation at reduced temperature was a clear but somewhat syrupy material having almost no taste or odor.

From the foregoing examples, it was concluded that an anzyme solution containing the essential flavor, and/or flavor and odor, of bread, can be used as a flavoring for bread mixes, including those which are leavened chemically rather than by natural yeast, as well as in other bread or non-bread products to which it is desired to impart a fresh bread flavor. One of the advantages of the composition is that, when prepared as outlined above or in an equivalent manner, the product is suitable for freeze drying and storage. Moreover, it may also be mixed with other constituents and then freeze-dried for storage and subsequent reactivation.

Since the flavor dealt ith is an actual flavor created by the same reaction which creates the flavor in natural bread, it is authentic, in contrast to other products which have resulted from attempts to analyze flavor into its individual components and then provide a mix of these individual components or synthetize new flavors from them. Because the product is made by the yeast process, it is a natural product, but being an enzyme, it does not actually contain living cells as does the yeast itself.

Consequently, it is not only suitable for storage, but undesired over-reactions are avoided in the preparation of the final product. This is achieved at least in part by using dilute nutrient solutions, such as the 0.5% glucose solution referred to herein. The metabolism of live yeast is such that it sometimes creates alcoholic or other undesirable flavors which are created by uncontrolled reactions. According to the invention, if too much nutrient is used, undesirable reaction products are created, while if the solution is substantially less than about 0.5%, the reaction products are unduly diluted. By using a very small amount of nutrient solution, the nutrients activate the yeast, causing it to secrete an exocellular enzyme, which is soluble and therefore remains in solution. The yeast itself is then separated from the solution. Consequently, to the extent that there is only yeast nutrient, and no available substrate for the yeast in the beginning of the process, glucose is used only to produce enzymes. After the separation of the yeast from the solution, while there is no measurable glucose still unconsumed by the yeast, the minuscule amounts of glucose, if any, still present in the solution would not be reactive with yeast, because the yeast has been previously separated from the solution.

If larger amounts of glucose were used, then it or other sugars might act as a substrate, and the sugar would then have the potential for being acted upon, degraded, or digested by the yeast, resulting in the undesired byproducts referred to elsewhere herein. The invention overcomes these difficulties.

While 0.5% glucose is not a theoretically exact or limited value, it is a preferred concentration, it being understood that significantly larger amounts would create undesirable reactions and that significantly smaller amounts would not activate the yeast.

As described above, the present product and method avoid the drawbacks characteristic of using live yeast in an attempt to create bread flavor and odor, without in any way compromising the taste, aroma and other high quality of the product, including its ability to be mixed with other products and to be stored indefinitely.

It will thus be seen that the present method provides a bread flavor and method of making it, including a storable dry powder bread flavoring product free from live yeast cells, with such flavoring material and method having a number of advantages and characteristics including those pointed out above and other which are inherent in the invention. A preferred embodiment of the invention having been described by way of illustration, it is anticipated that changes and modifications of the described bread flavor and method will occur to those skilled in the art and that such changes and modifications may be made without departing from the spirit of the invention or the scope of the appended claims.

I claim:

1. A method of preparing a yeast bread flavor composition suitable for indefinite storage, said method including the steps of mixing active breadmaking yeast with an aqueous nutrient solution of not more than about 0.5% sugar and allowing said mixture to react at a temperature of about 35°–40° C. for a period of time sufficient to form a solution of yeast enzymes, removing the yeast cells from the solution, mixing said yeast enzyme solution with a breadmaking flour, and permitting a reaction of said yeast enzyme solution and said flour to take place at about 35°–40° C. for a time sufficient to create reaction products which include a bread flavor solution portion and a spent flour portion, said reaction products being adapted for indefinite storage when dried.

2. A method as defined in claim 1 wherein said aqueous sugar solution is a solution of not more than about 0.5% glucose by weight in water.

3. A method as defined in claim 1 wherein said flour is a white bread making flour.

4. A method as defined in claim 1 wherein said yeast and said sugar reaction is an incubation reaction of about a two hour duration wherein said reaction between said enzyme solution and said flour is a flour digestion having a duration of about four hours, with said flour and said enzyme solution being stirred at least periodically during said digestion.

5. A method of preparing a concentrated solid yeast bread flavor solution, said method comprising preparing an enzyme solution by incubating a breadmaking yeast with an aqueous solution of not more than about 0.5% by weight of sugar for a period of time sufficient to permit substantial culturing of said yeast, separating the solid portions of said yeast from said mixture to provide a yeast-free liquid yeast enzyme solution, digesting breadmaking flour with said enzyme solution to produce a liquid flavor solution and a spent flour solid residue, separating the solid residue portion of said flour from said liquid flavor solution by drying to produce a solid bread flavor concentrate capable of extended storage, said flavor being adapted for subsequent mixing with bakery products to impart a natural bread flavor thereto.

6. A method as defined in claim 5 wherein said aqueous sugar solution is a solution of not more than about 0.5% glucose by weight in water.

7. A method as defined in claim 5 wherein said flour is a white breadmaking flour.

8. A method as defined in claim 5 wherein said drying comprises drying from the frozen state.

9. A method of preparing a concentrated solid bread flavor material adapted for indefinite storage, said method including the steps of preparing an enzyme solution by incubating a breadmaking yeast with an aqueous solution of not more than about 0.5% by weight of sugar for a period of time sufficient to permit substantial culturing of said yeast, separating the solid portions of said yeast from said mixture to provide a yeast-free liquid yeast enzyme solution, digesting breadmaking flour with said enzyme solution to produce a liquid flavor solution and a spent flour solid residue, separating the solid residue portion of said flour from said liquid flavor solution, drying said liquid flavor solution to produce a solid bread flavor concentrate, drying said spent flour residue to produce a solid spent flour concentrate, and mixing said solid bread flavor concentrate with at least a portion of said spent flour concentrate to produce an augmented composite solid flavor material capable of indefinite storage.

10. A method as defined in claim 9 wherein said aqueous sugar solution is a solution of about 0.5% glucose by weight in water.

11. A method as defined in claim 9 wherein said flour is a white breadmaking flour.

12. A method as defined in claim 9 wherein drying at least one of said flavor solution and said spent flour residue comprises drying from the frozen state.

13. A method as defined in claim 9 wherein both of said liquid flavor solution and said spent flour residue are dried from the frozen state.

* * * * *